United States Patent [19]

Katsevich et al.

[11] Patent Number: 5,550,892

[45] Date of Patent: Aug. 27, 1996

[54] ENHANCED LOCAL TOMOGRAPHY

[75] Inventors: Alexander J. Katsevich, Los Alamos, N.M.; Alexander G. Ramm, Manhattan, Kans.

[73] Assignee: The Regents of the University of California, Alameda, Calif.

[21] Appl. No.: 410,613

[22] Filed: Mar. 24, 1995

[51] Int. Cl.⁶ ................................................. G06F 15/66
[52] U.S. Cl. ............................................. 378/210; 378/901
[58] Field of Search ............................... 378/210, 901, 378/4; 364/413.14, 413.16, 413.17, 413.18, 413.19, 413.2

[56] References Cited

U.S. PATENT DOCUMENTS

| | | | |
|---|---|---|---|
| 4,189,775 | 2/1980 | Inouye | 364/414 |
| 4,365,339 | 12/1982 | Pavkovich | 378/15 |
| 4,433,380 | 2/1984 | Abele et al. | 378/901 X |
| 4,446,521 | 5/1984 | Inouye | 364/414 |
| 4,670,892 | 6/1987 | Abele et al. | 378/4 |
| 5,319,551 | 6/1994 | Sekiguchi et al. | 364/413.19 |

OTHER PUBLICATIONS

A. M. Cormack, "Representation of a Function by Its Line Integrals, With Some Radiological Applications," 9 Journal of applied Physics, vol. 34, pp. 2722–2727 (Sep. 1963).

R. H. Huesman, "A New Fast Algorithm for the Evaluation of Regions of Interest and Statistical Uncertainty in computed Tomography," 5 Phys. Med. Biol., vol. 29, pp. 543–552 (1984).

Adel Faridani et al., "Local Tomography," 2 Siam J. Appl. Math., vol. 52, pp. 459–484 (Apr. 1992).

*Primary Examiner*—David P. Porta
*Attorney, Agent, or Firm*—Ray G. Wilson

[57] ABSTRACT

Local tomography is enhanced to determine the location and value of a discontinuity between a first internal density of an object and a second density of a region within the object. A beam of radiation is directed in a predetermined pattern through the region of the object containing the discontinuity. Relative attenuation data of the beam is determined within the predetermined pattern having a first data component that includes attenuation data through the region. In a first method for evaluating the value of the discontinuity, the relative attenuation data is inputted to a local tomography function $f_\Lambda$ to define the location S of the density discontinuity. The asymptotic behavior of $f_\Lambda$ is determined in a neighborhood of S, and the value for the discontinuity is estimated from the asymptotic behavior of $f_\Lambda$. In a second method for evaluating the value of the discontinuity, a gradient value for a mollified local tomography function $\nabla f_{\Lambda\epsilon}(x_{ij})$ is determined along the discontinuity; and the value of the jump of the density across the discontinuity curve (or surface) S is estimated from the gradient values.

8 Claims, 3 Drawing Sheets

ENHANCED LOCAL TOMOGRAPHY

BACKGROUND OF THE INVENTION

This invention relates to image reconstruction from tomographic data, and, more particularly, to the definition of discontinuity location and size using limited tomographic data. This invention was made with government support under Contract No. W-7405-ENG-36 awarded by the U.S. Department of Energy. The government has certain rights in the invention.

Tomography produces the reconstruction of a generalized density function f from a large number of line integrals of f. A practically important objective is the reconstruction, from the x-ray data, of functions providing significant information about the physical object, such as the location of discontinuities within an object being interrogated. Tomography equipment for obtaining the attenuation data is well known. For example, in some instances a single source is collimated and traversed across the object, whereby a single sensor output corresponds to a single source transverse location. Here, the source traverses the object at each angular orientation of the object. In other instances, a single source generates a fan-like pattern of radiation that is detected by an array of sensors, where the object is located between the source and the sensor array. The source is then angularly rotated relative to the object to provide a complete set of tomographic data.

Conventional tomography is a global procedure in that the standard convolution formulas for reconstruction of the density at a single point require the line integral data over all lines within some planar cross-section containing the point. Local tomography has been developed for the reconstruction at a point where attenuation data is needed only along lines close to that point within the same cross-section. Local tomography produces the reconstruction of a related function using the square root of the negative Laplace operator and reproduces the locations of discontinuities within an object. See, e.g., E. Vainberg, "Reconstruction of the Internal Three-Dimensional Structure of Objects Based on Real-Time Integral Projections," 17 Sov. J. Nondestr. Test., pp. 415–423 (1981); A. Faridani et al., "Local Tomography," 52 SIAM J. Appl. Math, No. 2, pp. 459–484 (April 1992).

Local tomography can reduce significantly the amount of data needed for the local reconstruction, with a concomitant reduction in x-ray dose. While the location of a discontinuity is reproduced, however, them is no quantitative value for the magnitude of the discontinuity. In many instances it would be useful to know this value in order to make medical, technological, or geophysical conclusions.

Accordingly, it is an object of the present invention to determine both the location and size of discontinuities from tomographic data.

It is another object of the present invention to determine the location and size of discontinuities from only limited attenuation data that includes a region containing the discontinuity.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise a method for determining by tomography the location and value of a discontinuity between a first internal density of an object and a second density of a region within the object. A beam of radiation is directed in a predetermined pattern through the region of the object containing the discontinuity. Relative attenuation data of the beam is determined within the predetermined pattern having a first data component that includes attenuation data through the region.

In a first method for evaluating the value of the discontinuity, the relative attenuation data is inputted to a local tomography function $f_\Lambda$ to define the location S of the density discontinuity. The asymptotic behavior of $f_\Lambda$ is determined in a neighborhood of S, and the value for the discontinuity is estimated from the asymptotic behavior of $f_\Lambda$.

In a second method for evaluating the value of the discontinuity, a gradient value for a mollified local tomography function $\nabla f_{\Lambda\epsilon}(x_{ij})$ is determined along the discontinuity; and the value of the jump of the density across the discontinuity curve (or surface) S is estimated from the gradient values.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
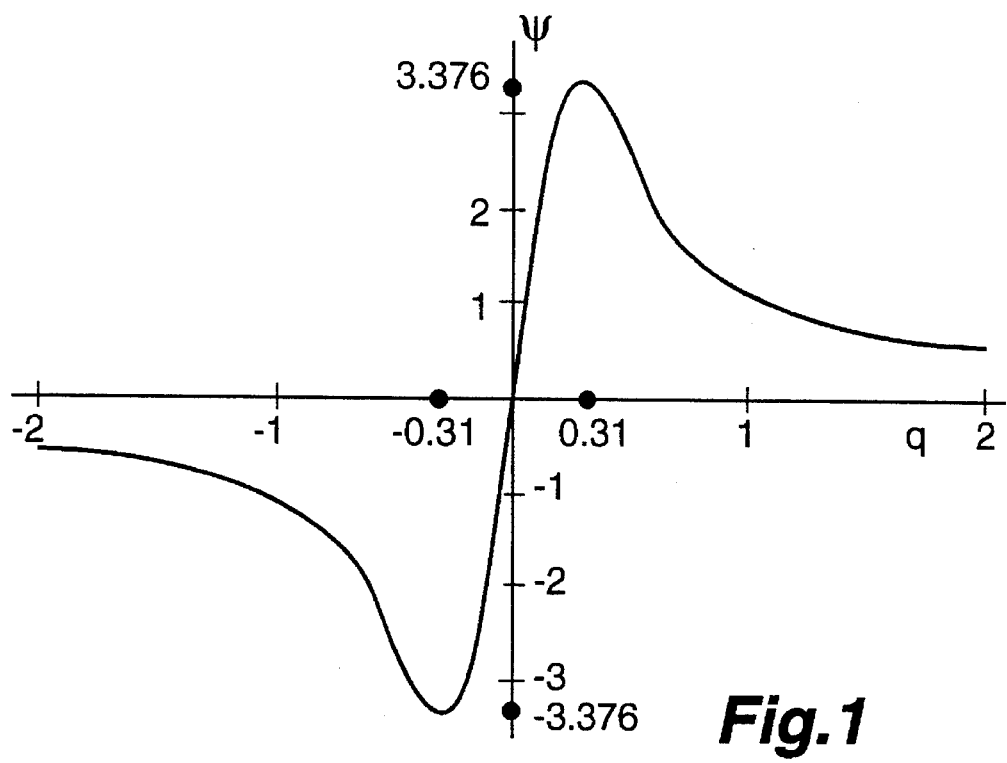
FIG. 1 is a graphical representation of the functions $\psi(q)$.

In accordance with the present invention, local tomography is enhanced to determine the sizes of density discontinuities within an object, as well as the location of the discontinuity. The density function f(x) is usually reproduced from the line integral data $\hat{f}(\theta,p)$, where $\theta$ is an angle on the unit circle and p is a location of a beam line, by the formula:

$$f(x) = \frac{1}{4\pi^2} \int_{S^1} \int_{-\infty}^{\infty} \frac{\hat{f}(\theta,p)}{x \cdot \Theta - p} \, dp \, d\theta, \text{ where } x \in \Re^2. \qquad \text{Eq. (1)}$$

A local tomography function $f_\Lambda$ is proposed in, e.g., E. Vainberg, "Reconstruction of the Internal Three-Dimensional Structure of Objects Based on Real-Time Integral Projections," 17 Sov. J. Nondestr. Test., pp. 415–423 (1981), and K.T. Smith et al., "Mathematical Foundations of computed Tomography," Appl. Optics, pp. 3950–3957 (1985):

$$f_\Lambda(x) = -\frac{1}{4\pi} \int_{S^1} \hat{f}_{pp}(\theta, \Theta \cdot x) d\theta, \qquad \text{Eq. (2)}$$

where $\Theta \in S^1$, $\theta$ is a scalar variable $0 < \theta < 2\pi$, $\hat{f}_{pp}$ is the second derivative with respect to p, and $S^1$ is the unit circle.

Then, it can be shown that $f_\Lambda$ satisfies $$f_\Lambda(x) = F^{-1}(|\xi|\tilde{f}(\xi)) = (-\Delta)^{1/2} f, \tilde{f}(\xi) = F(f) = \int_{\Re^2} e^{ix\cdot\xi} f(x) dx, \qquad \text{Eq. (3)}$$

where F and $F^{-1}$ denote Fourier transform and its inverse, respectively, and $(-\Delta)^{1/2}$ is the square root of the negative Laplacian.

In practice, the function $f_\Lambda$ is not computed, but its mollification $W_\epsilon * f_\Lambda$. A mollifier is a kernel such that its convolution with f(x) gives a sufficiently smooth function that converges to f(x) as $\epsilon \to 0$. Let $W_\epsilon$ be a sequence of sufficiently smooth mollifiers that satisfy the following properties:

(a) $W_\epsilon(x)$ is a radial function, $W_\epsilon(x) = W_\epsilon(|x|)$;
(b) $W_\epsilon(x) = 0$, $|x| > \epsilon$; $W_\epsilon(x) > 0$, $|x| < \epsilon$; and
(c) $W_\epsilon(x) = \epsilon^{-2} W_1(x/\epsilon)$, $\int_{|x|<1} W_1(x) dx = 1$.

It can be shown that $$f_{\Lambda\epsilon}(x) = W_\epsilon * f_\Lambda(x) = -\frac{1}{4\pi} \int_{S^1} \int_\Re w_\epsilon(\Theta \cdot x - p) \hat{f}_{pp}(\theta, p) dp d\theta, \qquad \text{Eq. (4)}$$

$$w_\epsilon = R W_\epsilon$$

where R is the Radon transform. Integrating by parts, one gets $$f_{\Lambda\epsilon}(x) = -\frac{1}{4\pi} \int_{S^1} \int_\Re w_\epsilon''(\Theta \cdot x - p) \hat{f}(\theta, p) dp d\theta. \qquad \text{Eq. (4)}$$

From Eq. (3) it is seen that $f_\Lambda$ is the result of the action of pseudo-differential operator (PDO) with symbol $|\xi|$ on f. Let S be a discontinuity curve of f and pick $x_0 \in S$, so that S is smooth in the neighborhood of $x_0$. The asymptotic formula for $f_\Lambda$ in a neighborhood of $x_0$ can be shown to be $$f_\Lambda(x_s + hn_+(x_s)) = -\frac{D(x_s)}{\pi} h^{-1}(1 + o(1)) + \eta(x_s), x_s \in S, h \to 0. \qquad \text{Eq. (5)}$$

Combining Eqs. (4) and (5), and using the properties of $W_\epsilon$, for a sufficiently small $\epsilon > 0$ so that S can be considered flat inside an $\epsilon$-neighborhood of $x_0$: $n_+(x_s) = n_+(x_0) = n_+$, $|x_s - x_0| < \epsilon$, yields $$f_{\Lambda\epsilon}(x_s + hn_+) = -\frac{D(x_s)}{\pi} \int_{h-\epsilon}^{h+\epsilon} w_\epsilon(h-t) \frac{1 + o(1)}{t} dt + \eta_\epsilon(x_s + hn_+), \qquad \text{Eq. (6)}$$

$$\frac{|h|}{\epsilon} < \infty, \epsilon \to 0,$$

where $\eta_\epsilon = \eta * W_\epsilon$. Since $w_\epsilon = RW_\epsilon$, $$w_\epsilon(p) = \qquad \text{Eq. (7)}$$

$$\int_\Re W_\epsilon(\sqrt{p^2 + t^2}) dt = \frac{1}{\epsilon^2} \int_\Re W_1\left(\sqrt{\frac{p^2 + t^2}{\epsilon^2}}\right) dt =$$

$$\frac{1}{\epsilon} \int_\Re W_1\left(\sqrt{\frac{p^2}{\epsilon^2} + t^2}\right) dt = \frac{1}{\epsilon} w_1\left(\frac{p}{\epsilon}\right)$$

and $$f_{\Lambda\epsilon}(x_s + hn_+) = \qquad \text{Eq. (8)}$$

$$-\frac{D(x_s)}{\pi} \frac{1}{\epsilon} \int_{(h/\epsilon)-1}^{(h/\epsilon)+1} w_1\left(\frac{h}{\epsilon} - t\right) \frac{1 + o(1)}{t} dt + \eta_\epsilon(x_s + hn_+),$$

$$\frac{|h|}{\epsilon} < \infty, \epsilon \to 0$$

Figure 2:
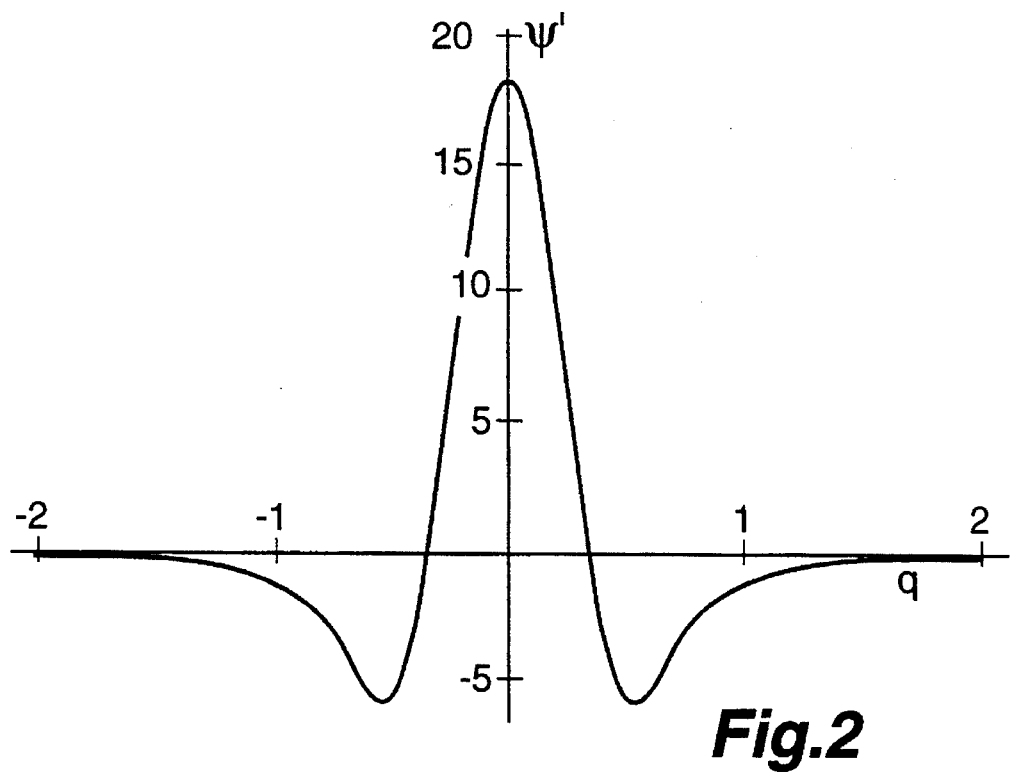
FIG. 2 is a graphical representation of the functions $\psi'(q)$.

Since $\eta$ is smooth in the neighborhood of $x_0$, the function $\eta_\epsilon = \eta * W_\epsilon$ is also smooth and variation of $\eta_\epsilon$ is neglected compared with the variation of $\psi$ on distances on the order of $\epsilon$ from $x_0$. Thus, from Eq. (8) and letting $q = h/\epsilon$, an approximate formula for $f_{\Lambda\epsilon}$ in a neighborhood of $x_0$ is:

$$f_{\Lambda\epsilon}(x_s + hn_+) = -\frac{D(x_s)}{\pi\epsilon} \psi(q)(1 + o(1)) + c, \epsilon \to 0, \qquad \text{Eq. (9)}$$

$$\psi(q) = \int_{q-1}^{q+1} \frac{w_1(q-t)}{t} dt, \qquad \text{Eq. (10)}$$

where $c = \eta_\epsilon(x_s)$. In the case of the mollifier $$W_1(x) = \frac{(m+1)}{\pi}(1 - |x|^2)^m, m = 8, \qquad \text{Eq. (11)}$$

the graphs of $\psi$ and $\psi'$ are shown in FIGS. 1 and 2, respectively.

Equation (9) explicitly relates the behavior of $f_{\Lambda\epsilon}$ in a neighborhood of $x_S$ with the unknown quantity $D(x_S)$, which is the value of the jump of f at $x_S \in S$. Since $f_{\Lambda\epsilon}$ is computed by Equation (4) from the tomographic data and the function $\psi(q)$ can be tabulated for a given sequence of mollifiers, an estimation of the value of the density discontinuity jump $D(x_S)$ of the original function f at $x_S$ is provided by Equation (9).

A first process for evaluating $D(x_S)$ begins with the computed local tomography function calculated on a square grid with step size $h: x_{i,j} = (x_i^{(1)}, x_j^{(2)}) = (ih, jh)$, where i and j are integers. Choose a grid node $x_{i_0 j_0}$ on S, and assume that h and $\epsilon$ are sufficiently small that changes of $f_{\Lambda\epsilon}$ can be neglected in the direction parallel to S, i.e., assume $D(x_S) = D(x_{i_0 j_0})$ if $|x_S - x_{i_0 j_0}| < \epsilon$. Then Eq. (9) can be written as $$f_{\Lambda\epsilon} \approx -\frac{D(x_{i_0 j_0})}{\pi\epsilon} \psi\left(\frac{x - x_{i_0 j_0}}{\epsilon} \cdot n_+\right) + c, \epsilon << 1. \qquad \text{Eq. (12)}$$

Fix $n_1, n_2 \in N$ and consider a $(2n_1+1) \times (2n_2+1)$ window around $x_{i_0 j_0}$. First, estimate $n_+$ by computing partial derivatives $$N_+ \approx \frac{(f_{\Lambda\epsilon}(x_{i_0+1,j_0}) - f_{\Lambda\epsilon}(x_{i_0-1,j_0}), f_{\Lambda\epsilon}(x_{i_0,j_0+1}) - f_{\Lambda\epsilon}(x_{i_0,j_0-1}))}{((f_{\Lambda\epsilon}(x_{i_0+1,j_0}) - f_{\Lambda\epsilon}(x_{i_0-1,j_0}))^2 + (f_{\Lambda\epsilon}(x_{i_0,j_0+1}) - f_{\Lambda\epsilon}(x_{i_0,j_0-1}))^2)^{1/2}}. \qquad \text{Eq. (13)}$$

The estimate is accurate up to a factor (−1), i.e., $N_+ = \pm n_+$. Then find $D(x_{i_0 j_0})$ by solving the minimization problem $$\sum_{|i-i_0| \leq n_1, |j-j_0| \leq n_2} \left(f_{\Lambda\epsilon} + \frac{D(x_{i_0 j_0})}{\pi\epsilon} \psi\left(\frac{x - x_{i_0 j_0}}{\epsilon} \cdot n_+\right) - c\right)^2 \to \min \qquad \text{Eq. (14)}$$

so that

-continued $$|D(x_{i_0 j_0})| \approx \pi\epsilon \frac{\left| \sum_{|i-i_0|\leq n_2, |j-j_0|\leq n_1} f_{A\epsilon}(x_{ij})\psi\left(\frac{x_{ij}-x_{i_0 j_0}}{\epsilon}\cdot N_+\right)\right|}{\sum_{|i-i_0|\leq n_1, |j-j_0|\leq n_2}\psi^2\left(\frac{x_{ij}-x_{i_0 j_0}}{\epsilon}\cdot N_+\right)} \quad \text{Eq. (15)}$$

Note that the larger values of $f_{A\epsilon}$ correspond to the side of S with larger values of f.

Thus, the following process provides estimates of jumps of f from $f_{A\epsilon}$:

1. Estimate vector $N_+$ from Eq. (13);

Calculation of $|D(x_{i_0 j_0})|$ from Eqs. (14) and (15) is most stable if the function $\psi$ on the interval $$X = \left[ \min_{|i-i_0|\leq n_1, |j-j_0|\leq n_2}\left(\frac{x_{ij}-x_{i_0 j_0}}{\epsilon}\cdot n_+\right), \max_{|i-i_0|\leq n_1, |j-j_0|\leq n_2}\left(\frac{x_{ij}-x_{i_0 j_0}}{\epsilon}\cdot n_+\right)\right] \quad \text{Eq. (16)}$$

differs from a constant as much as possible. For example, the graph of $\psi(q)$ shown in FIG. 1 suggests that the interval X should be close to the interval between q-coordinates of the local minimum and the local maximum of $\psi(q)$, i.e., $X \approx [-0.31, 0.31]$.

A second process for evaluating $D(x_S)$ from the local tomography approach provides values of the jumps from tomographic data in one step. Taking the gradient on both sides of Eq. (12) provides an approximate equality $$|\nabla f_{A\epsilon}(x_{i_0 j_0})| \approx \frac{|D(x_{i_0 j_0})|}{\pi\epsilon^2}\psi'(0), x_{i_0 j_0} \in S, \epsilon \ll 1, \quad \text{Eq. (16)}$$

so that $$|D(x_{i_0 j_0})| \approx |\nabla f_{A\epsilon}(x_{i_0 j_0})|\frac{\pi\epsilon^2}{\psi'(o)}. \quad \text{Eq. (17)}$$

The modulus of the gradient of $|\nabla f_{A\epsilon}(x_{ij})|$ can be calculated (Eq. (4)) to get $$|\nabla f_{A\epsilon}(x)| = \left(\left(\frac{\partial f_{A\epsilon}(x)}{\partial x_1}\right)^2 + \left(\frac{\partial f_{A\epsilon}(x)}{\partial x_2}\right)^2\right)^{1/2}. \quad \text{Eq. (18)}$$

For each θ it is convenient to compute $$g(q,\theta) = \int_{\Re} w_\epsilon^{m}(q-p)\hat{f}(\theta,p)dp \quad \text{Eq. (19)}$$

for all q in the projection of the support of f on the direction Θ, and then compute $$\frac{\partial f_{A\epsilon}(x)}{\partial x_1} = -\frac{1}{4\pi}\int_{S^1} \cos(\theta)g(\Theta\cdot x, \theta)d\theta \quad \text{Eq. (20)}$$

$$\frac{\partial f_{A\epsilon}(x)}{\partial x_1} = -\frac{1}{4\pi}\int_{S^1} \cos(\theta)g(\Theta\cdot x, \theta)d\theta \quad \text{Eq. (20)}$$

$$\frac{\partial f_{A\epsilon}(x)}{\partial x_2} = -\frac{1}{4\pi}\int_{S^1} \sin(\theta)g(\Theta\cdot x, \theta)d\theta. \quad \text{Eq. (21)}$$

Thus, the following process provides estimated values of jumps of f:

1. Compute $\nabla f_{A\epsilon}(x_{ij})$ using Eqs. (19), (20), (21);
2. Estimate $|D(x_{ij})|$ using Eqs. (17), (18);
3. The vector $\nabla f_{A\epsilon}(x_{ij})$ points from the smaller values of f to the larger values of f.

For the mollifier represented by Eq. (11), $\psi'(0)$ can be computed using Eq. (7):

$$w_1(p) = \frac{m+1}{\pi}\int_{-1}^{1}(1-p^2-t^2)^m dt = \quad \text{Eq. (22)}$$

$$c(1-p^2)^{m+0.5}, c = \frac{2^{m+1}(m+1)!}{\pi(2m+1)!!}$$

$$\psi'(0) = -\int_{-1}^{1}\frac{w'_1(t)}{t}dt = c(2m+1)\int_{-1}^{1}(1-t^2)^{m-0.5}dt = 2(m+1) \quad \text{Eq. (23)}$$

Figure 3:
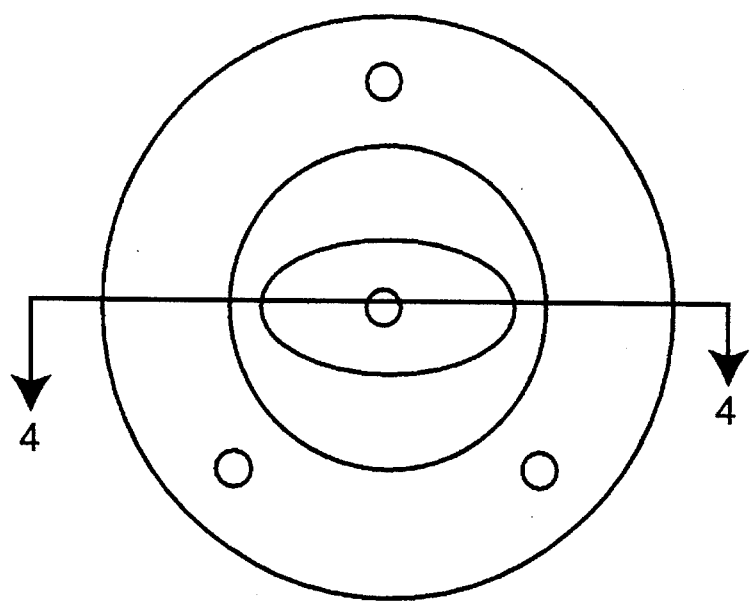
FIG. 3 illustrates an exemplary phantom for generating Radon transform data.

FIG. 3 illustrates an exemplary phantom for generating the Radon transform data. The densities are: exterior: 0, ellipse: 1.0, exterior annulus: 0.8, area between the annulus and the ellipse: 0, three small circles: 1.8, center circle: 0.1. The Radon transform was computed for 350 angles equispaced on [0, π] and 601 projections for each angle.

Figure 4:
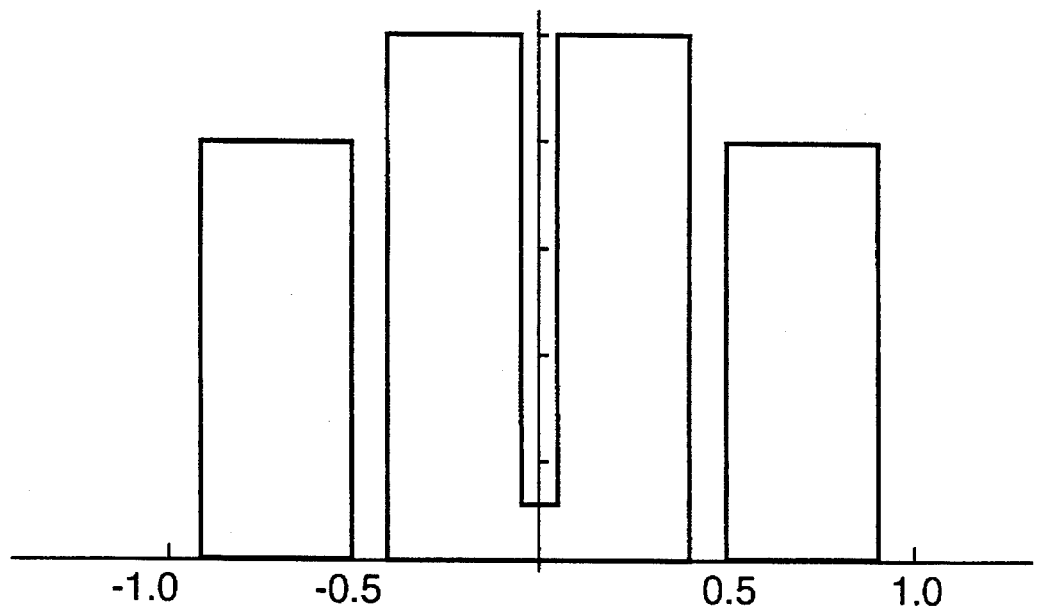
FIG. 4 is a horizontal cross-section of the density plot through the phantom shown in FIG. 3.

The horizontal cross-section of the density distribution of the phantom is shown in FIG. 4. The function, $f_{A\epsilon}$ was computed at the nodes of a square 201×201 grid using the mollifier of Eq. (11) with $\epsilon=9\Delta p$, where $\Delta p$ is the discretization step of the p-variable. This value of $\epsilon$ means that the discrete convolutions were computed using 19 points per integral. The grid step size was h=3Δp, so that h/ε=⅓.

Figure 5:
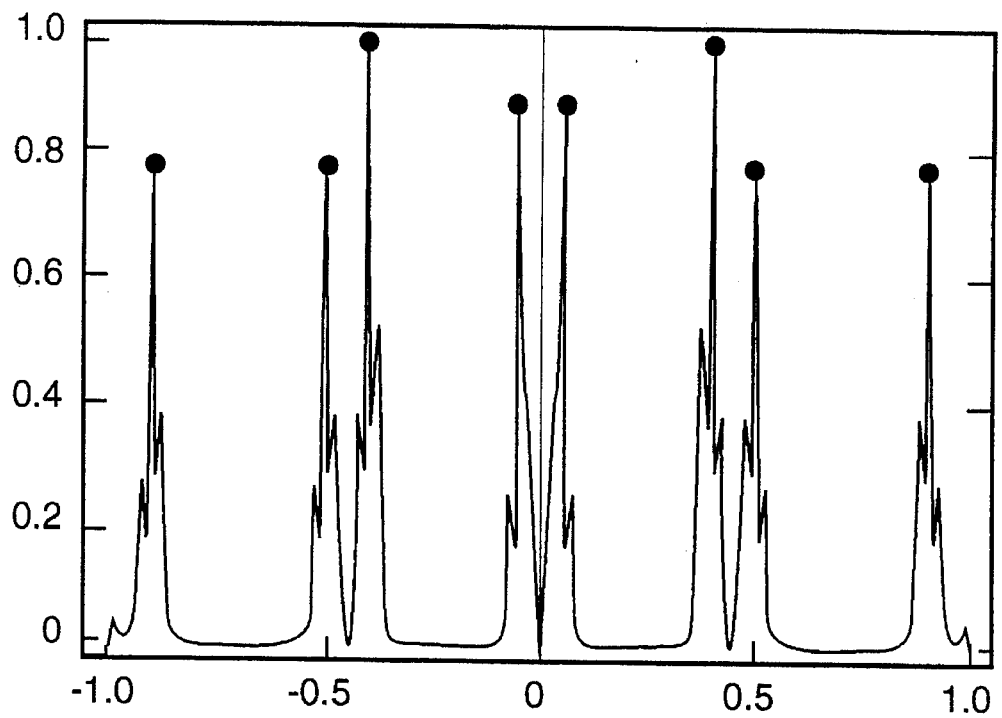
FIG. 5 is a horizontal cross-section of the local tomographic density discontinuity values obtained according to a first reconstruction process of the present invention.
Figure 6:
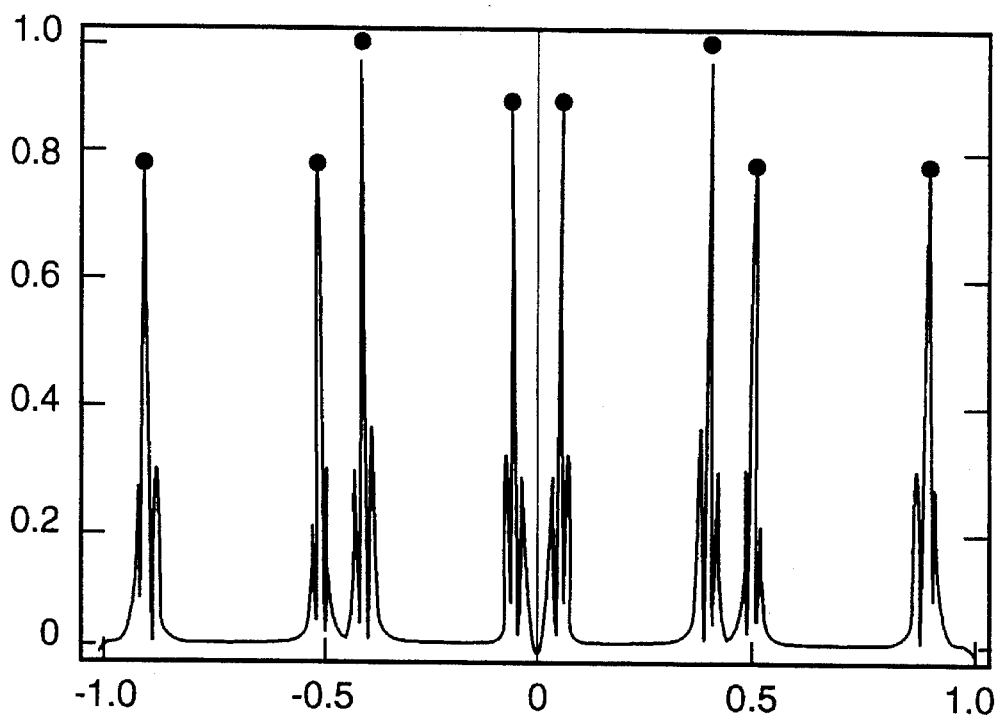
FIG. 6 is a horizontal cross-section of the local tomegraphic density discontinuity values obtained according to a second reconstruction process of the present invention.

A central horizontal cross-section of the density distribution represented by the estimated $|D(x)|$ from the first process is shown in FIG. 5, with $n_1=n_2=1$, i.e., a 3×3 window. It is seen that for the given ratio h/ε=⅓ and window size $n_1=n_2=1$, the interval X is very close to optimal. The line with peaks is the computed $|D(x)|$; the dots represent the actual value of the jumps of the original density function f (see FIG. 4). The estimated jump values are in good agreement with the actual values.

The second process was used on the same phantom structure shown in FIGS. 3 and 4. The grid parameters are the same as for the first process. Again, the line with peaks is the computed $|D(x)|$; the dots represent the actual jump values of f. Again, there is good agreement between the actual jump values and the estimated jump values.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for estimating by tomography the location and value of a discontinuity between a first internal density of an object and a second density of a region within said object, comprising the steps of:

directing a beam of radiation in a predetermined pattern through said region of said object containing said discontinuity;

determining relative attenuation data of said beam within said predetermined pattern having a first data component that includes attenuation data through said region;

inputting said relative attenuation data to a local tomography function $f_A$ to define said location S of said discontinuity;

determining the asymptotic behavior of $f_A$ in a neighborhood of S; and estimating said value for said discontinuity from said asymptotic behavior of $f_\Lambda$.

2. A method according to claim 1, wherein said asymptotic behavior of $f_\Lambda$ is determined with the function $\psi$ computed from a selected sequence of mollifiers, where $$f_{\Lambda\epsilon} \approx -\frac{D(x_{i_0 j_0})}{\pi\epsilon} \psi\left(\frac{x - x_{i_0 j_0}}{\epsilon} \cdot n_+\right) + c, \epsilon \ll 1.$$

3. A method according to claim 1, wherein said step of determining said asymptotic behavior includes the steps of:

estimating the vector $N_+$, where $$N_+ \approx \frac{(f_{\Lambda\epsilon}(x_{i_0+1,j_0}) - f_{\Lambda\epsilon}(x_{i_0-1,j_0}), f_{\Lambda\epsilon}(x_{i_0,j_0+1}) - f_{\Lambda\epsilon}(x_{i_0,j_0-1}))}{((f_{\Lambda\epsilon}(x_{i_0+1,j_0}) - f_{\Lambda\epsilon}(x_{i_0-1,j_0}))^2 + (f_{\Lambda\epsilon}(x_{i_0,j_0+1}) - f_{\Lambda\epsilon}(x_{i_0,j_0-1}))^2)^{1/2}}$$

to determine the direction of variation of said local tomography function $f_\Lambda$ about said discontinuity location S;

inputting said vector $N_+$ to $$|D(x_{i_0 j_0})| \approx \pi\epsilon \frac{\left|\sum_{|i-i_0|\leq n_2, |j-j_0|\leq n_1} f_{\Lambda\epsilon}(x_{ij}) \psi\left(\frac{x_{ij} - x_{i_0 j_0}}{\epsilon} \cdot N_+\right)\right|}{\sum_{|i-i_0|\leq n_1, |j-j_0|\leq n_2} \psi^2\left(\frac{x_{ij} - x_{i_0 j_0}}{\epsilon} \cdot N_+\right)}$$

for estimating said value of said discontinuity.

4. A method according to claim 2, wherein said function $\psi$ is evaluated over an interval over which $\psi$ has the greatest variation.

5. A method according to claim 3, wherein said asymptotic behavior of $f_\Lambda$ is determined from $$f_{\Lambda\epsilon} \approx -\frac{D(x_{i_0 j_0})}{\pi\epsilon} \psi\left(\frac{x - x_{i_0 j_0}}{\epsilon} \cdot n_+\right) + c, \epsilon \ll 1$$

with the function $\psi$ computed from a selected sequence of mollifiers.

6. A method according to claim 5, wherein said function $\psi$ is evaluated over an interval over which $\psi$ has the greatest variation.

7. A method for estimating by tomography the location and value of a density discontinuity between a first internal density of an object and a second density of a region within said object, comprising the steps of:

directing a beam of radiation in a predetermined pattern through said region of said object containing said discontinuity;

determining relative attenuation data of said beam within said predetermined pattern having a first data component that includes attenuation data through said region;

inputting said relative attenuation data to a local tomography function $f_\Lambda$ to define said location S of said discontinuity;

compute a gradient value $\nabla f_{\Lambda\epsilon}(x_{ij})$ along said discontinuity where, $$|\nabla f_{\Lambda\epsilon}(x)| = \left(\left(\frac{\partial f_{\Lambda\epsilon}(x)}{\partial x_1}\right)^2 + \left(\frac{\partial f_{\Lambda\epsilon}(x)}{\partial x_2}\right)^2\right)^{1/2}$$

$$g(q, \theta) = \int_{\mathfrak{R}} w_\epsilon'''(q-p) \hat{f}(\theta, p) dp$$

$$\frac{\partial f_{\Lambda\epsilon}(x)}{\partial x_1} = -\frac{1}{4\pi} \int_{S^1} \cos(\theta) g(\Theta \cdot x, \theta) d\theta$$

$$\frac{\partial f_{\Lambda\epsilon}(x)}{\partial x_2} = -\frac{1}{4\pi} \int_{S^1} \sin(\theta) g(\Theta \cdot x, \theta) d\theta,$$

and estimating the value $|D(x_{ij})|$ of said density discontinuity along S by inputting said gradient value to $|D(x_{i_0 j_0})| \approx |\nabla f_{\Lambda\epsilon}(x_{i_0 j_0})| \pi \epsilon^2 / \psi'(0)$.

8. A method according to claim 7, wherein said gradient value indicates the direction of change for said density discontinuity.

* * * * *